US006822219B1

(12) United States Patent
Braun

(10) Patent No.: US 6,822,219 B1
(45) Date of Patent: Nov. 23, 2004

(54) TIMING DEVICE

(75) Inventor: Paul-Wilhelm Braun, Troisdorf (DE)

(73) Assignee: PWP-Ruhlatec Industrieprodukte GmbH, Seebach (DE)

(*) Notice: Subject to any disclaimer, the term of this patent is extended or adjusted under 35 U.S.C. 154(b) by 0 days.

(21) Appl. No.: 09/629,810

(22) Filed: Jul. 31, 2000

(30) Foreign Application Priority Data

Jun. 20, 2000 (DE) .......................................... 100 29 380

(51) Int. Cl.[7] ................................................ G01D 5/34
(52) U.S. Cl. ........................... 250/231.13; 250/231.14; 341/11
(58) Field of Search ..................... 250/231.13, 231.14, 250/231.17, 231.18, 231.16, 237 G, 237 R; 33/707, 706; 356/138, 616, 617; 341/11, 13, 31

(56) References Cited

U.S. PATENT DOCUMENTS

| 4,443,694 A | | 4/1984 | Sanford ...................... 235/465 |
|---|---|---|---|
| 4,673,810 A | * | 6/1987 | Babsch et al. ............ 250/231.1 |
| 4,899,048 A | * | 2/1990 | Shelander ............... 250/231.14 |
| 5,129,725 A | * | 7/1992 | Ishizuka et al. ............ 356/617 |
| 5,508,088 A | * | 4/1996 | Braun ......................... 428/195 |
| 5,841,133 A | * | 11/1998 | Omi ....................... 250/231.13 |
| 6,140,636 A | * | 10/2000 | Norton et al. ......... 250/231.18 |
| 6,392,224 B1 | * | 5/2002 | Holzapfel et al. ..... 250/231.13 |

FOREIGN PATENT DOCUMENTS

| DE | 37 37 278 C2 | | 5/1988 | ............ H03M/1/22 |
|---|---|---|---|---|
| DE | 41 37 092 C2 | | 5/1993 | ............ G01B/7/30 |
| DE | 42 32 864 A1 | | 3/1994 | ............ G01P/3/66 |
| DE | 198 05 207 A1 | | 9/1999 | ........... G01B/21/00 |
| DE | 19805207 | * | 9/1999 | ........... G01B/21/00 |
| EP | 0 503 716 A1 | | 9/1992 | .......... G01D/5/249 |
| GB | 2 347 492 A | | 9/2000 | .......... G01D/5/347 |

OTHER PUBLICATIONS

Jankowski, Translation of DE 19805207, "Method for Determining a Moving Direction", Sep. 9, 1999.*

* cited by examiner

Primary Examiner—Edward J. Glick
Assistant Examiner—Chih-Cheng Glen Kao
(74) Attorney, Agent, or Firm—Darby & Darby

(57) ABSTRACT

A timing device, such as a timing disk or a timing ruler is provided with a carrier having at least one code track of a group and overlapping therewith and at least one code marking, which is scanned by a sensor unit to produce signals. The code track or tracks have a different optical density in comparison to the first group, and the code markings within a code track overlap. Also disclosed is a positioning device which includes a timing disk or a timing ruler with a carrier having a first group of code markings in at least one code track. Here the code markings are scanned by at least one sensor unit for producing a signal and the signal processing device for converting the sensor signal into a control signal is connected after the sensor unit.

10 Claims, 4 Drawing Sheets

Region a-b | Region b-c

A - Light source
B - Light sensor
L - Light beam
C - Timing device

A - Light source
B - Light sensor
L - Light beam
C' - Reflective timing device

Amplitude height for black bars (Region a-b)

Amplitude height for gray bars (Region b-c)

Combination of the amplitude heights of Fig. 2 and Fig. 3.
The height of the amplitude is defined by the gray levels

TIMING DEVICE

BACKGROUND OF THE INVENTION

1. Field of the Invention

The present invention relates to a timing device such as a timing disk or a timing ruler which consists of a carrier having a first group of code markings disposed in at least one code track, which group of code markings is scanned by at least one sensor unit for producing a digital signal.

2. Description of the Related Art

A timing disk or a timing ruler of the aforedescribed type is described, for example, in U.S. Pat. No. 5,508,088 (common assignee's PWB basic patent). According to an embodiment of the device described therein, three concentric code tracks are arranged on a timing disk, with each of the code tracks having different markings. Three sensor units are required for scanning the three tracks, with the sensor units arranged in a similar manner as those of FIG. 1a, 1b or 2a, 2b of the known device. Accordingly, to scan several tracks disposed on a timing disk, several sensor units are arranged side-by-side in the radial direction, which increases the overall size of the scanning unit. In addition, several sensing devices require more complex electrical circuits, so that the device can more easily malfunction due to mechanical shock. The increased parts count and the more complex software introduces additional sources for errors. This is a significant disadvantage for the further improvement of printers, scanners and copiers. In practice, the carrier also ages which tend to make the carrier material opaque, or becomes contaminated, which is a particular problem with open systems such as inkjet printers. Both these situations can introduce errors if the sensor interprets the impurities as code markings.

SUMMARY OF THE INVENTION

It is an object of the present invention to improve the design of the timing device such as timing disks or timing rulers to make them more robust and less error-prone. It is another object to simultaneously capture several separate optical signals using one sensor unit through simple, material-specific and circuit-related measures. It is yet another object to provide continuous signal amplification, as used for example with potentiometer systems, and to economically produce a simple position measurement device, for example for a steering angle sensor.

These and other objects are solved with the invention by the characterizing features recited in the claims. It has been observed that two or more groups of code markings can be detected independently from one another using a single sensor unit, if the code markings of the groups have a different optical density. "Optical density" refers to a gradation in gray levels between approximately 100% (dark-gray) to approximately 0% (fully transparent, fully reflective). Absolute positioning preferably is not attained by using bars, but rather by taking advantage of the increasing or decreasing gray levels. The optical density changes in this case, so that the sensor produces signals having a high intensity and corresponding to a low optical density and produces signals having a low intensity and corresponding to a high optical density, or vice versa.

The different groups of code markings in a track can be scanned simultaneously using a two-channel or a multi-channel sensor unit. The groups of code markings may also overlap one another. It is sufficient if the sensor unit senses a noticeable change in the optical density, which causes a corresponding change in the voltage captured by the sensor unit. Voltage differences of, for example, 100 $\mu$V have proven to be adequate; however, other voltage differences can be used depending to the sensitivity of the measurement devices.

Suitable sensor units consist of an LED or another light source and of photo transistors or other light sensitive scanning devices. For controlling start and/or end positions or for calibration purposes, these sensor units can detect signals with either a constant separation or an arbitrary separation over the entire segment ranges of the timing disk or the timing ruler.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1A:
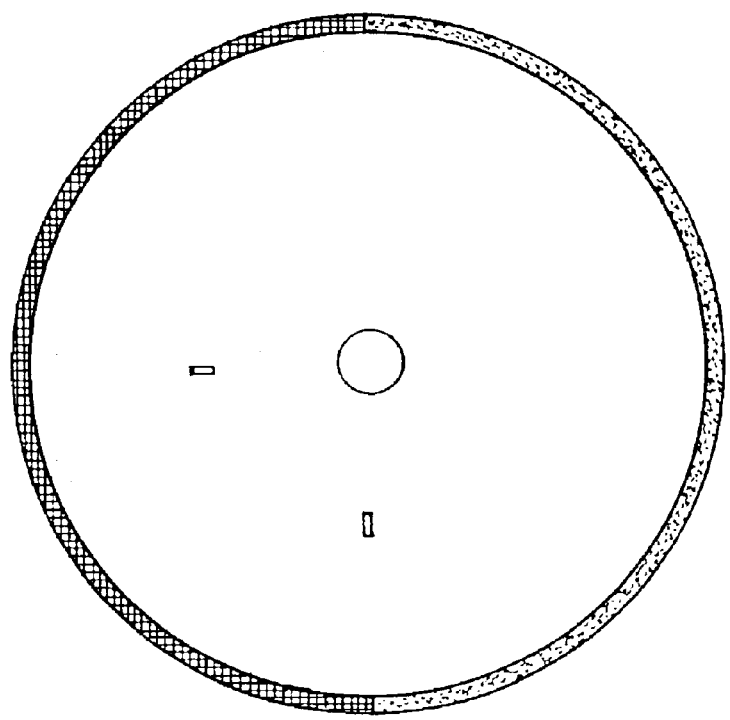
FIGS. 1a and b show a segment of a timing disk with different groups of code markings.
Figure 1B:
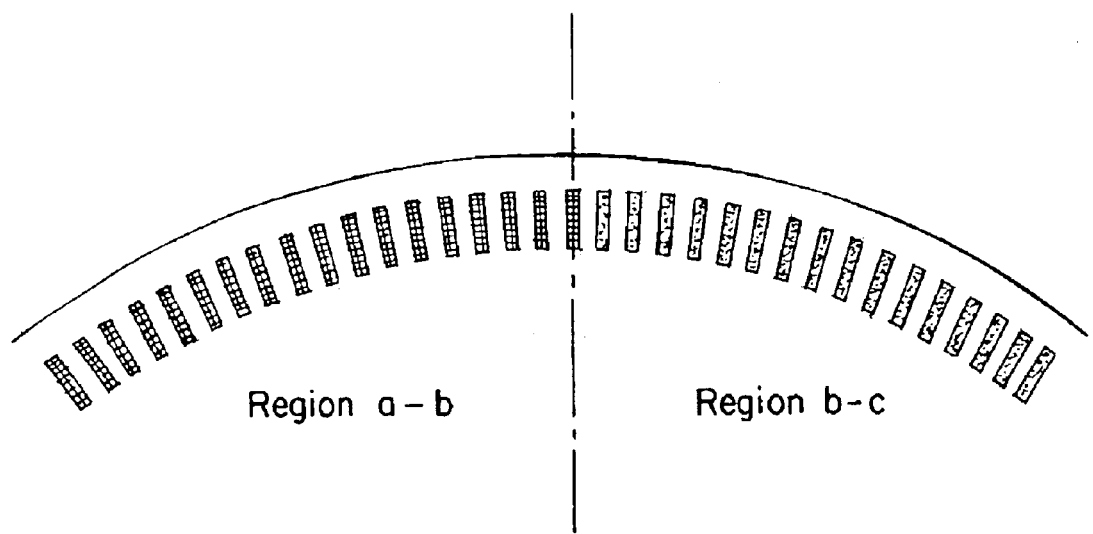
FIGS. 1c and d show different arrangements of sensor/emitter units.
FIG. 1e shows an embodiment of a timing disk according to the invention.
Figure 2:
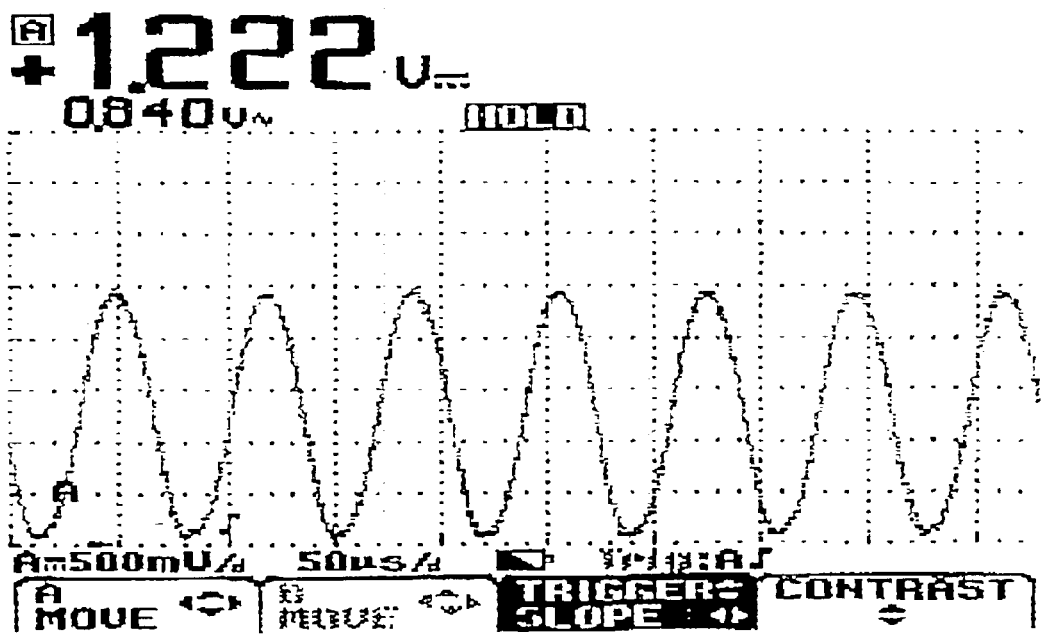
FIG. 2 shows a scanning signal from a sensor unit during scanning of a first group of code markings.
Figure 3:
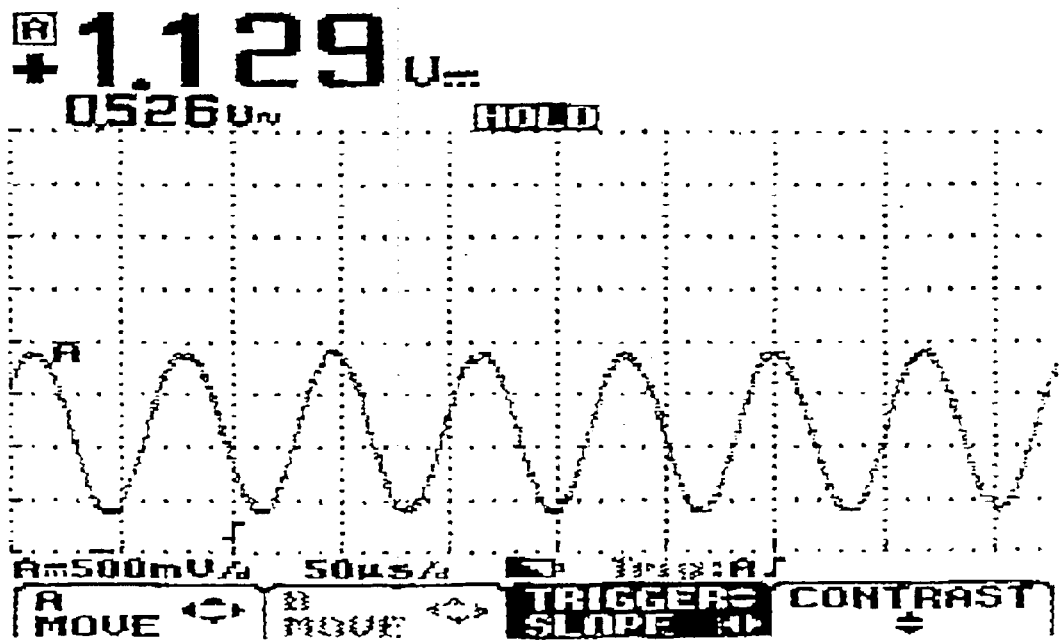
FIG. 3 shows a scanning signal from a sensor unit during scanning of a second group of code markings.
Figure 4:
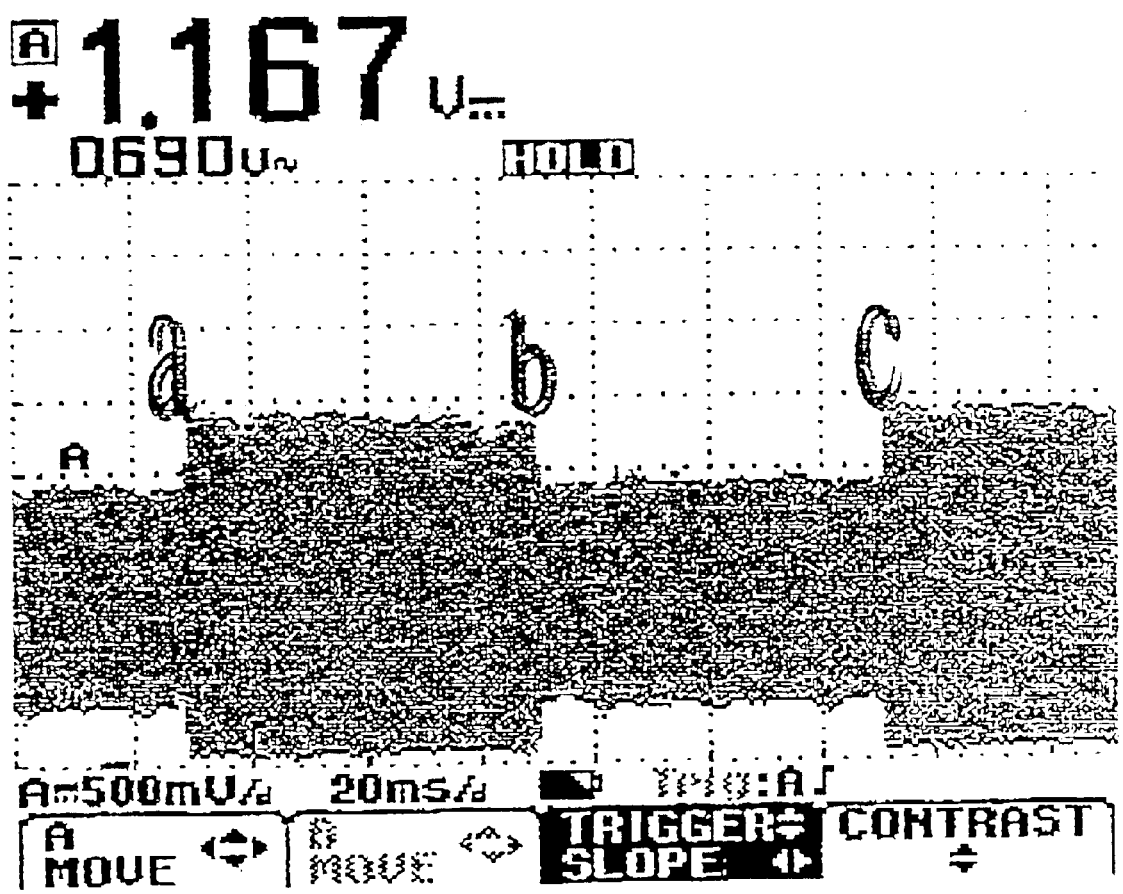
FIG. 4 shows a combination of the scanning signals of FIG. 2 and FIG. 3.

FIGS. 1a and b depict the segment of a timing disk having dark-gray and light-gray code bars. The steps in the different gray levels have to be selected so that aging and/or contamination of the timing disk does not produce erroneous scanning signals. The scanning signals of the regions a-b, b-c from the segment of the timing disk illustrated and FIG. 1b are recorded in the voltage-frequency curves depicted in FIGS. 2 and 3. As can be seen, a large signal voltage corresponding to a large amplitude (due to the black tint of the bars) is produced in the region a-b, whereas only a reduced signal voltage corresponding to a smaller amplitude (due to the lesser optical density of the code bars) is detected in the region b-c. Comparable arguments can be applied to reflecting timing disks.

Figure 1C:
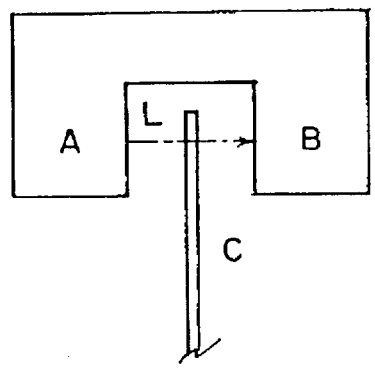
Figure 1D:
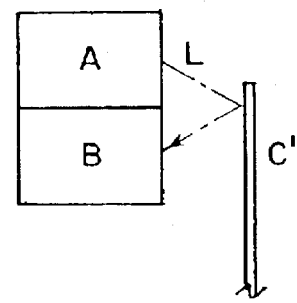

FIG. 1c illustrates an arrangement where a light beam L passes through a transparent timing device C from a light source A to a light sensor B. Alternatively, a reflective timing device C' could be used in an arrangement as shown in FIG. 1d, where the light source and the light sensor are located on the same side of the timing device.

The following description is intended to explain the principle of the positioning measurement in more detail with reference to a specific example. Positioning measurement devices should enable contact-less photoelectric scanning of an incremental scale, while maintaining a high measurement accuracy. The pitch of the code markings can be changed with proper circuit design, for example by using phase-multiplying circuits or potentiometer circuits. If the pitch consists of consecutive light and a dark fields of identical size, then a photo transistor scanning across the pitch will produce a sinusoidal voltage with a wavelength corresponding to the sum of the two lengths of a light field and a dark field. Alternatively, the existing pitch can be subdivided further, thereby producing a potentiometer circuit.

The signal intensity of the standard timing disk remains constant. With an analog sensor, for example a sensor of the type Hewlett-Packard (Agilent Technologies)—Q9846+ 0007, additional pulses for calibration are produced without requiring additional code tracks. An analog signal derived therefrom can be used for advancing paper, for stitching lines and/or for absolute positioning in printers, scanners or copiers.

According to the invention, in addition to the existing signals from the first group of code markings, a second variable is introduced, for example a change of the gray level of the code markings. The gray level determines the light transparency or the optical density and thereby the amplitude of signal. It is also possible to identify each angular position as an absolute position and to identify intermediate steps in analogy to an optical potentiometer.

Figure 1E:
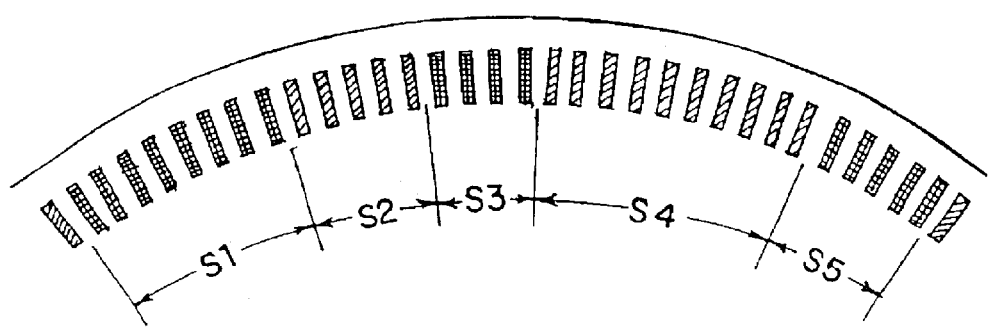

Arbitrary intermediate steps can be encoded by a suitable gradation of the gray levels. In the example of FIG. 1e, such arbitrary steps are demarcated by segments s1, s3, s5 . . . of black bars alternating with segments s2, s4, . . . of gray bars. The segments defined in this manner can be used to control different functions.

Advantageously, although not necessarily, the signals of the first group of code markings can have a constant period independent of the gray level. Control devices of this type, due to their different light transparency, can also be applied to timing disks or timing rulers having slit markers for photo interrupters or other devices that produce an analog signal.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A timing device comprising a carrier having a first group of code markings and at least one higher-order group of code markings disposed in at least one code track, said first and at least one higher-order group of code markings being scanned by at least one sensor unit to produce signals, said at least one sensor unit comprising a light source and a photo-transistor, wherein the code markings of the at least one higher-order group are superimposed on the code markings of the first group in the at least one code track, wherein the at least one code track has a basic optical density level, wherein the code markings of the first group are bars of equal width and equally spaced from one another, whereas the code markings of the at least one higher-order group are distributed over the code track with an arbitrary spacing and are formed by step changes from a first optical density level to at least a second optical density level of said bars, said step changes serving for controlling different functions, wherein the basic, the first, and the at least second optical density levels are different in comparison to each other, so that there are at least three different optical density levels with a detectable gradation of optical density, and wherein the detectable gradation is used for generating control or position signals.

2. The timing device according to claim 1, wherein the at least one sensor unit for scanning the first group and the at least one higher-order group of code markings consists of a single sensor-emitter-unit.

3. The timing device according to claim 1, wherein in the sensor unit a two-channel evaluation of optical signals is performed.

4. The timing device according to claim 1, wherein the at least three different optical density levels differ from each other by predefined amounts of optical density.

5. The timing device according to claim 4, wherein the at least three different optical density levels correspond to at least three different gray levels which can span a range between light-blocking and almost complete transparency.

6. The timing device according to claim 5, wherein the carrier of the timing device is made of a reflecting material and the at least three different optical density levels are constituted by different degrees of reflectivity.

7. The timing device of claim 1, wherein said different functions include at least one of the functions of controlling a start position, controlling an end position, calibrating the timing device, and determining an absolute position of the timing device.

8. The timing device according to claim 1, wherein the light source is an LED.

9. The timing device according to claim 1, wherein in the sensor unit a multi-channel evaluation of optical signals is performed.

10. A positioning device, comprising a timing device with a carrier having a first group of code markings and at least one higher-order group of code markings disposed in at least one code track, with the first and at least one higher-order group of code markings being scanned by at least one senor unit for producing a sensor signal, said at least one sensor unit comprising a light source and a photo-transistor, wherein the code markings of the at least one higher-order group are superimposed on the code markings of the first group in the at least one code track, wherein the at least one code track has basic optical density level, wherein the code markings of the first group are bars of equal width and spaced at constant intervals from one another, whereas the code markings of the at least one higher-order group are distributed over the code track with an arbitrary spacing and are formed by step changes from a first optical density level to at least a second optical density level of said bars, said step changes serving for controlling different functions, and wherein the code markings of the at least one higher-order group are used for at least one of the purposes of controlling a start position, controlling an end position, calibrating the timing device, and determining an absolute position of the timing device; said positioning device further comprising a signal processing device that converts the sensor signal into a control signal and is connected after the sensor unit, wherein the basic, the first, an the at least second optical density levels are different in comparison to each other, so that there are at least three different optical density levels with a detectable gradation of optical density, and wherein the detectable gradation is used for generating control or position signals.

* * * * *

UNITED STATES PATENT AND TRADEMARK OFFICE
CERTIFICATE OF CORRECTION

PATENT NO. : 6,822,219 B1
DATED : November 23, 2004
INVENTOR(S) : Paul-Wilhelm Braun It is certified that error appears in the above-identified patent and that said Letters Patent is hereby corrected as shown below:

<u>Title page,</u>
Item [73], Assignee, delete "PWP-Ruhlatec Industrieprodukte GmbH, Seebach (DE)" and substitute with -- PWB-Ruhlatec Industrieprodukte GmbH, Seebach (DE) --.

Signed and Sealed this

Nineteenth Day of April, 2005

JON W. DUDAS
*Director of the United States Patent and Trademark Office*